C. DIEBOLD.
DISINTEGRATING FURNACE-SLAG.
No. 170,717. Patented Dec. 7, 1875.
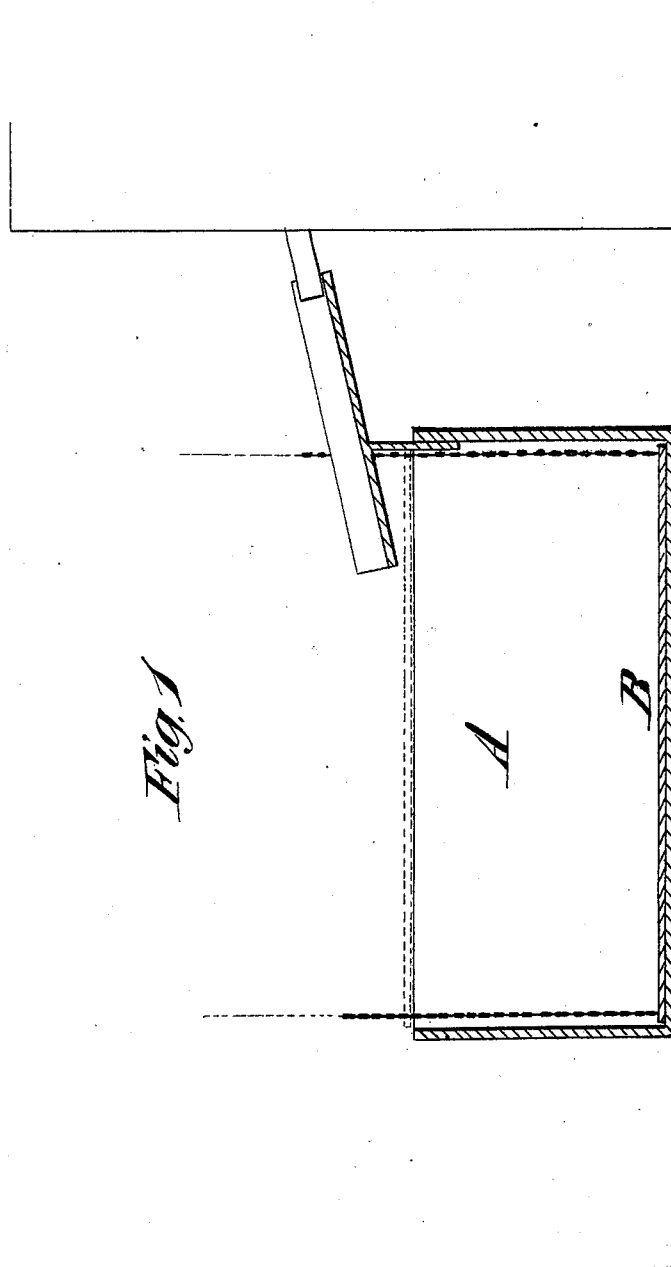
WITNESSES
INVENTOR

UNITED STATES PATENT OFFICE.

CHARLES DIEBOLD, OF LEBANON, PENNSYLVANIA.

IMPROVEMENT IN DISINTEGRATING FURNACE-SLAG.

Specification forming part of Letters Patent No. 170,717, dated December 7, 1875; application filed February 21, 1874.

*To all whom it may concern:*

Be it known that I, CHARLES DIEBOLD, of Lebanon, in the county of Lebanon and State of Pennsylvania, have invented a new and valuable Improvement in the Method of Converting Furnace-Slag, &c., into Sand; and I do hereby declare that the following is a full, clear, and exact description of the construction of the same.

This invention has for its object an economical method of reducing the slag and cinders of furnaces; and the nature of my invention consists in a vertically-movable slab, in combination with a tank for containing water in which to deposit the slag, and disintegrate it by suddenly cooling it, the said slab serving as a means for readily removing the disintegrated material from the tank, as will be understood from the following description.

In carrying my invention into effect, I arrange below the furnace-grate, or at any other suitable point with relation to a furnace, a tank, A, containing water, in which tank a slab, B, is suitably arranged. This slab B is designed to receive upon it the highly-heated slag and cinders previous to their immersion in the water. The slab is vertically movable by suitable means, so that when a charge of the slag and cinders is deposited upon it from the furnace it can be quickly lowered and submerged in the bath, thereby suddenly cooling and disintegrating the slag and cinders on it, and reducing them to a state which will make them useful for very many purposes. When the substances are thus cooled and disintegrated the slab is raised out of the bath, and the reduced material is raked off and dried, when it is ready for use.

Having described my invention, what I claim as new is—

The combination, with the water-tank A, of the vertically-movable slab B, for the purposes herein set forth.

In testimony that I claim the above I have hereunto subscribed my name in the presence of two witnesses.

CHAS. DIEBOLD.

Witnesses:
BASSLER BOYER,
ANTHONY S. ELY.